United States Patent Office 2,953,547
Patented Sept. 20, 1960

2,953,547

METHOD OF PREPARING CROSS-LINKED VINYL AROMATIC RESINOUS POLYMERS

James A. Patterson, Menlo Park, and Irving M. Abrams, San Carlos, Calif., assignors to Chemical Process Company, San Francisco, Calif., a corporation of Nevada No Drawing. Filed Dec. 28, 1955, Ser. No. 555,797

6 Claims. (Cl. 260—73)

This invention relates to the preparation of insoluble and infusible cross-linked polymers, and to the formation of reaction products of such polymers.

Linear polymers of aromatic organic compounds, such as polystyrene, are well known. Such polymers are composed of chains of polymerized monomer without cross-linking between separate adjacent polymeric chains. Since solid linear polymers are thermoplastic, they are extensively employed for manufacturing a wide variety of plastic articles by molding, extruding, or stamping the solid polymers under heat and pressure. Although it would be desirable to employ the resultant inexpensive, mass produced thermoplastic articles for uses in which they are subjected to heat, the linear polymeric articles are unsuitable for such purposes since heat tends to fuse or distort the articles. Furthermore, linear thermoplastic polymers are soluble in various organic solvents. For example, monovinyl aromatic polymers, such as linear polystyrene, are soluble in organic solvents such as benzene, toluene, dioxane and chlorinated aliphatic liquids. Consequently, articles manufactured from linear polymers tend to dissolve in many organic solvents with which they may come in contact.

Cross-linked polymers differ considerably from linear polymers because of the linkages that connect the polymeric chains. The cross-linked polymers are infusible and insoluble in liquids which are solvents for the corresponding linear polymers. Such cross-linked polymers are commonly prepared from liquid or gaseous mixtures of their monomeric components. For example, monovinyl liquid monomers, such as styrene, form cross-linked polymeric structures when copolymerized with a polyvinyl cross-linking agent, such as divinylbenzene. Also, condensation-type cross-linked polymers, such as some phenol-formaldehyde resins, are prepared from their components by the application of heat, which renders the resultant solid polymers infusible and substantially insoluble in organic and inorganic liquids. Although cross-linked polymers are advantageously employed for purposes in which they are subjected to heat or solvents, once a polymer has been cross-linked, it cannot be shaped by the mass production techniques employed with linear polymers.

Summarizing this invention, it comprises effecting cross-linking of an aromatic polymer, such as polyvinyl aromatic polymer, by placing the polymer in contact with a mixture of a formaldehyde source and a strong, concentrated sulfur-containing acid. The mixture of such an acid and a formaldehyde source forms a complex, herein called acid-formaldehyde complex, which reacts with and converts a thermoplastic linear aromatic polymer into a cross-linked structure that is infusible and insoluble in organic and inorganic liquids. Best results are obtained with mixtures of acid and formaldehyde that contain a minimum amount of free water, since water affects the degree of cross-linking adversely in proportion to the amount of water present.

When a polar, oxygen-containing liquid, such as methanol, is added to an acid-formaldehyde complex in which the sulfur-containing acid is a halosulfonic acid, herein called halosulfonic acid-formaldehyde complex, active side chains which readily undergo further chemical reaction are formed in an aromatic polymer subjected to the complex in addition to cross-linking between polymeric chains.

Cross-linking a solid linear aromatic polymer by the method of this invention permits the advantageous properties of both linear polymers and cross-linked polymers to be utilized. The solid, thermoplastic linear aromatic polymer can be molded, extruded, stamped, or poured into any desirable shape, and then subjected to the complex of strong sulfur-containing acid and formaldehyde to convert the linear polymer into a cross-linked polymer that is insoluble and infusible. As a result, an article can be mass-produced in the conventional manner from a linear aromatic polymer, and the solid polymer can then be cross-linked so that the article may be subjected to relatively high temperatures or to organic solvents without fusing or dissolving. For example, tanks for containing oils, such as vegetable oil, can be formed from linear aromatic polymers, such as linear polystyrene, and the polymers then cross-linked to render the vessels insoluble in such liquid. Filter frames for filtering hot materials, and molded containers that may be subjected to elevated temperatures or organic solvents, are other examples of articles that are advantageously produced by the method of this invention. In addition, resin matrices for ion exchange resins can be shaped into any form, cross-linked by the acid-formaldehyde complex hereof, and then functional ion exchange groups attached to the resin matrix. The term "resin matrix" or "resin matrices" as employed herein designate the hard, infusible carrier resin or resins that are insoluble in polar and non-polar solvents, and to which functional ion exchange groups are attached.

Although the complex hereof is most advantageously used to cross-link solid linear aromatic polymers for the foregoing reasons, the complex may also be employed to convert solutions of solid linear polymers into cross-linked polymers. The mixture of the linear polymer solution and complex can be poured into a mold where it is transformed into a solid cross-linked article. In addition, vinyl aromatic polymers that are already cross-linked by copolymerization with a polyvinyl compound, can be subjected to the complex hereof in order to increase the amount of cross-linking between polymeric chains, and also to attach active side chains to the cross-linked polymer when the complex including the polar liquid and the halosulfonic acid is employed.

The presence of active side chains introduced into the aromatic polymer by including a polar liquid in the halosulfonic acid-formaldehyde complex is usually of no advantage when the linear aromatic polymer is cross-linked solely in order to render it insoluble and infusible. Consequently, a complex of sulfur-containing acid and a formaldehyde source may be used alone when infusibility and insolubility is desired.

However, if the polymer is to be subjected to further reactions, such as when it is employed as a resin matrix for an ion exchange resin in which functional ion exchange groups are attached to the polymer, the more hydrophilic polymeric structure provided by including a polar solvent in a halosulfonic acid-formaldehyde complex is preferably employed. More rapid reaction in attachment of functional ion exchange groups and also in subsequent ion exchange reactions is obtained with the hydrophilic structure. Also, when a cross-linked matrix for an ion exchange membrane is provided by forming a thin film of the aromatic vinyl polymer that has been cross-linked together with formation of active side chains by the halosulfonic acid-formaldehyde complex, the resultant structure is relatively resistant to cracking upon undergoing subsequent reaction for introduction of functional ion exchange groups, compared to a film of vinyl aromatic resin matrix cross-linked in the usual manner with a polyvinyl compound. Furthermore, the active side chains introduced by the halosulfonic acid-formaldehyde complex can be aminated to provide an insoluble, infusible anion exchange resin, as more completely described in applicants' copending application for "Anion Exchange Resins and Method of Preparation Thereof," Serial No. 555,791, filed December 28, 1955, now Patent No. 2,900,352.

In greater detail, linear polyvinyl aromatic polymers that can be converted into cross-linked polymers by the method of this invention are well known. Such linear polymers are commercially available and they are prepared in the customary manner by polymerizing a monovinyl aromatic compound alone or with another monovinyl compound to provide a linear polymer that is fusible and soluble in various non-aqueous solvents. Substituted or unsubstituted monovinyl aromatic compounds are employed for forming the linear polymer. Examples of suitable monovinyl aromatic compounds are styrene, vinyl toluene, alpha-methyl styrene, vinyl xylene, vinyl naphthalene, ethylvinylbenzene, monochlorostyrene and vinyl anthracene, each of which has a vinyl group attached directly to the aromatic nucleus whereby aromatic nuclei are attached directly to the polymerized vinyl chain in polymers of such aromatic vinyl compounds. Linear polystyrene, which is commonly sold to fabricators in the form of small particles, is at present used more than any other molding resin for mass producing plastic articles, and the acid-formaldehyde complex hereof is particularly effective in cross-linking this molding grade linear polystyrene in order to render it insoluble and infusible.

Suitable linear aromatic polymers that can be cross-linked in accordance with this invention can also be formed by copolymerizing an aromatic monovinyl compound with a monovinyl compound that does not contain an aromatic nucleus, such as vinyl chloride or acrylonitrile. It is only necessary that one component of the copolymer contain aromatic nuclei so that there will be nucei available for cross-linking. Even polymers already partially cross-linked, such as polystyrene polymerized in a conventional manner with a small amount of divinylbenzene, may be further cross-linked by subjecting such polymers to the complex of strong sulfur-containing acid and a formaldehyde source.

Monovinyl aromatic monomers are readily polymerized to form solid linear polymers in the usual manner by heating the liquid monomer in the presence of a catalyst. Suitable catalysts include the organic peroxides, such as benzoyl peroxide, lauroyl peroxide, and methylethylketone peroxide. Azo compounds, such as azobis-isobutyronitrile are also useful as catalysts. Even heat alone causes polymerization of the vinyl monomer, although the rate of polymerization is very slow in the absence of a catalyst. Consequently, the polymerization is generally conducted with a catalyst at temperatures from about 80° C. to 120° C. Between approximately 0.1% and 2.0% by weight of catalyst, based upon the weight of monovinyl compound, is generally employed. Polymerization is most advantageously continued until the liquid monomer is transformed into a solid, linear, fusible polymer that can be shaped by heat and pressure. The bead form of the linear polymer is readily prepared by the well known technique of suspension polymerization described in Chapter I, pages 1 to 20 of "High Molecular Weight Organic Compounds," by Hohenstein and Mark. The linear polymer may be washed with water and dried at a temperature below that at which fusion will occur.

Cross-linking of the linear aromatic polymer is effected by subjecting the polymer to contact with a mixture of a formaldehyde source, and a strong, concentrated sulfur-containing acid. Strong acids are defined as acids that are substantially completely ionized in dilute aqueous solutions. Examples of suitable sulfur-containing acids are halosulfonic acids, such as chlorosulfonic acid; and sulfuric acid, including sulfur trioxide and fuming sulfuric acids such as oleum. The most rapid and complete cross-linking of linear polymers is obtained when chlorosulfonic acid is employed in the acid-formaldehyde complex. However, the other acids also provide substantial cross-linking of aromatic polymers. Although concentrated aqueous solutions of such acids cross-link polymeric chains when they are mixed with a formaldehyde source, water affects the degree of cross-linking adversely in proportion to the amount of water present. Preferably, a concentration of at least 70% by weight acid is employed based on the weight of acid and free water in the complex, and substantially anhydrous sulfur-containing acids are employed for best results in cross-linking. However, substantial formation of active side chains is obtained with a halosulfonic acid-formaldehyde complex even when appreciable quantities of water are present in the complex.

Weak acids or dilute acids do not provide the desired cross-linking between linear aromatic polymeric chains. For example, acetic acid, which is incompletely ionized, does not produce cross-linking when it is the only acid present. Also, commercial concentrated nitric acid, and concentrated hydrochloric acid are not sufficiently concentrated to provide the desired extent of cross-linking. Although concentrated acids other than the specified acids, such as fuming nitric acid and gaseous hydrochloric acid, produce cross-linking of the vinyl aromatic polymer when they are combined with a formaldehyde source, such acids are difficult to employ. Fuming nitric acid must be used at greatly reduced temperatures in order to avoid explosive reactions, and gaseous hydrochloric acid is very corrosive and difficult to handle. The gaseous hydrochloric acid may be combined with formaldehyde gas and the linear polymer placed in an atmosphere of the gaseous mixture, or the hydrochloric acid gas may be liquified under pressure together with a formaldehyde source. However, since sulfur-containing strong acids are easier to handle and they produce a greater degree of cross-linking, such acids are most advantageously employed.

Formaldehyde, or a compound that is a source of formaldehyde, both herein referred to under the term "reacted with formaldehyde" or "reacting with formaldehyde" or "formaldehyde reactant," is mixed with the strong acid to form the cross-linking complex hereof. The formaldehyde source should desirably not contain any appreciable quantity of water, since water has the effect of diluting the acid and reducing or destroying the cross-linking property of the acid formaldehyde complex. However, commercial aqueous formaldehyde solutions, such as formalin, produce a degree of cross-linking, and provide substantial formation of active side chains. Any reversible polymer of formaldehyde that acts chemically as a solid source of formaldehyde, such as the polyoxymethylenes, is employed for best results. Paraformaldehyde, trioxane and tetraoxymethylene are examples of suitable solid formaldehyde sources. Although formaldehyde gas can be continuously introduced into the strong acid when the linear polymer is immersed therein to provide cross-linking of an aromatic polymer, a non-gaseous source of formaldehyde is most advantageously utilized since the quantity of formaldehyde can then be readily measured and conveniently controlled.

When a polar, oxygen-containing liquid that is a non-solvent for the linear polymer is mixed with a complex of a formaldehyde source, and a halosulfonic acid, the complex introduces active side chains into a vinyl aromatic polymer subjected to the complex, in addition to cross-linking the polymeric chains of the polymer in the same manner as the acid-formaldehyde complex without the polar liquid. The active side chains render the polymer much more hydrophilic than the aromatic polymer that is cross-linked without formation of side chains. Chlorosulfonic acid is an example of a suitable acid that produces side chain formation. Other acids that produce cross-linking such as sulfuric acid and oleum, do not effect appreciable introduction of side chains into the aromatic nuclei of the polymer even when a polar liquid is included in a complex with such acids.

The polar liquids that cause formation of side chains with vinyl aromatic polymers when mixed with the halosulfonic acid-formaldehyde complex above specified are oxygen-containing liquids that are non-solvents for the polymers, and which are substantially miscible with water. Such polar compounds are hereinafter included under the term "low molecular weight electronegative oxygen-containing aliphatic liquid non-solvent for the linear aryl polymer. Compounds that are not strongly polar, such as chlorinated aliphatic liquids, tend to dissolve the polymer before cross-linking can be achieved, and thus are unsuitable for use in the complex. Examples of suitable polar liquids are the low molecular weight primary alcohols, ketones, aldehydes, liquid organic acids and nitroparaffins. Primary alcohols up to and including butanol are excellent for providing side chains in an aromatic polymer when the alcohols are mixed in the complex. Methanol is the polar liquid that produces best results, since it causes the introduction of a greater number of side chains into the aromatic nuclei of the polymer than the other polar liquids. Alcohols that have a molecular weight higher than butanol are generally not suitable since they tend to dissolve linear aromatic polymers. Low molecular weight liquid ketones, aldehydes and organic acids that do not dissolve the linear aromatic polymer, such as acetone, acetaldehyde, and dichloroacetic acid, are also suitable. Although nitroparaffins may be employed as the polar liquid, they provide less than half as many side chains as methanol. Even water, which is a polar liquid, provides a degree of side chain formation in the aromatic nuclei of the polymer, as long as the amount of water is not so large that it dilutes the acid sufficiently to render the complex ineffective. Whereas, relatively small amounts of water appreciably decrease the extent of cross-linking, the side chain formation occurs in the presence of substantial quantities of water. In general, basic polar liquids should be avoided since they tend to neutralize the acid in the complex.

In order to obtain maximum possible cross-linking between the polymeric chains, at least two moles of strong sulfur-containing acid and two moles of formaldehyde monomer or equivalent should be present for each aromatic nucleus in the polymer. However, even very small quantities of acid and formaldehyde provide sufficient cross-linking to render the polymer substantially insoluble and infusible. The amount of cross-linking is increased with increasing amounts of complex until a maximum is reached at almost two moles of acid and formaldehyde for each aromatic nucleus, after which a further increase in the amount of acid and formaldehyde has no further cross-linking effect. For practical purposes, in order to have sufficient complex to cover the polymer, a complex containing at least about four moles of acid and four moles of formaldehyde is employed.

The proportional amount of acid to formaldehyde in the complex is not critical as long as each component is present in an amount sufficient to produce the desired extent of cross-linking. An excess of either acid over formaldehyde, or formaldehyde compared to the quantity of acid does not increase the extent of cross-linking, since only equi-molar amounts of the components are active in producing cross-linking. The excess of either component is usually not harmful, but it is merely wasted. However, a substantial excess of the sulfur-containing acid usually should be avoided or else the aromatic nuclei of the polymer may be sulfonated. Sulfonation of the polymer before appreciable cross-linking has occurred tends to produce partial solution of a linear polymer. When the formaldehyde source is a base, such as hexamethylenetetramine, an excess of acid is employed to neutralize the base.

It is standard practice to determine the extent of cross-linking of styrene-divinylbenzene copolymers by measuring the swelling of the polymer when it is immersed in a non-polar organic solvent, such as benzene. The amount of swelling is inversely related to the percent of divinylbenzene or in other words to the degree of cross-linking, and the relationship can be graphically plotted. Treatment of a linear styrene polymer with a complex containing two or more moles of chlorosulfonic acid mixed with two or more moles of formaldehyde in the form of paraformaldehyde for each aromatic nucleus in the polymer, has produced an amount of cross-linking equivalent to that obtained by reacting styrene with from 6–8 percent by weight divinylbenzene. When a polymer having active side chains is formed by use of a halosulfonic acid-formaldehyde complex that includes an oxygen-containing polar liquid, the degree of cross-linking is about the same as without the polar liquid. However, it has been found that upon heating such a polymer that has active side chains, hydrochloric acid and formaldehyde are given off and the extent of cross-linking is increased to about the equivalent of fifty percent by weight divinylbenzene copolymerized with about fifty percent by weight of the monovinyl compound. Since copolymerization of styrene with as little as 0.01 percent by weight divinylbenzene provides a polymer that swells but which is substantially insoluble in non-polar solvents, the extent and effectiveness of cross-linking a linear aromatic polymer by the method of this invention is readily apparent.

Any amount of the polar liquid hereof in a complex of the halosulfonic acid and formaldehyde source causes some active side chain formation when an aromatic polymer is treated with such a complex. Maximum active side chain formation is assured by use of about two moles of polar liquid for each aromatic nucleus. The proportional amount of polar liquid present in the complex is not critical. Only approximately equi-molar quantities of the halosulfonic acid, formaldehyde, and polar solvent are effective in forming active side chains. Consequently, such equi-molar amounts are preferably employed, since an excess of one component over any other does not increase or decrease active side chain formation.

The cross-linking complex of strong acid and a formaldehyde source is formed by dissolving the formaldehyde source in the acid. When a solid formaldehyde source, such as paraformaldehyde, is dissolved in concentrated acid, such as sulfuric acid, the mixture can be heated in order to increase the rate of solution. However, temperatures above about 55° C. are avoided in order to prevent a highly exothermic reaction. If either concentrated sulfuric acid, including fuming sulfuric acid, or chlorosulfonic acid is employed, it is usually preferable to dissolve the formaldehyde source in the acid before the aromatic polymer is immersed in acid in order to prevent sulfonation and solution of the linear aromatic polymer. The combination of a formaldehyde source with the strong sulfur-containing acid to form the complex hereof prevents sulfonation of the aromatic nucleus that would occur without the formaldehyde.

In preparing a complex that includes a polar solvent for introducing active side chains into the polymer as well as for effecting cross-linking of the polymeric chains, the components of the complex may be mixed in any order. The formaldehyde source can be dissolved in the polar liquid, such as methanol, and the halosulfonic acid added gradually with stirring and cooling. It has been found that the complex which includes the polar solvent slowly ages after it has been prepared, and gradually loses the property of introducing active side chains into the polymer, even though the complex retains its ability to cross-link the polymer. Storage of the complex in a refrigerator enables it to retain active side-chain forming properties for many months.

Cross-linking alone and also with formation of side chains is effected by immersing the aromatic vinyl polymer in the complex, preferably with agitation. The complex effects reactions on the immediate surface of a solid polyvinyl aromatic polymer within a few minutes, but complete penetration throughout the polymer may take several hours or more. The period for maximum extent and penetration of the reactions varies depending upon the type and dimensions of the polymer being treated, the particular acid and source of formaldehyde employed, and the conditions of cross-linking. The temperature of the complex is advantageously maintained below 50° C., and for best results below 32° C. in order to prevent sulfonation of the aromatic nucleus. Sulfonation is usually not desirable unless a cation exchange resin is to be formed since sulfonation tends to reduce resistance of the polymer to crushing. The cross-linked polymer is washed with water and preferably with a weak alkali solution to remove the acid, and then it may be dried by any conventional means. When the active side chains are to be utilized, water is employed alone without alkali to wash out the acid, and drying below 50° C. is preferred in order not to destroy the activity of the side chains.

When methanol is the polar solvent that is included in a chlorosulfonic acid-formaldehyde mixture in order to introduce active side chains into an aromatic vinyl polymer, a highly complex mixture is formed which generally separates into two phases. With the complex of chlorosulfonic acid, paraformaldehyde and methanol, the lower phase has a specific gravity of about 1.7, and the upper phase has a specific gravity of about 1.35. The upper phase constitutes on the average of about one part by volume to seven parts by volume of the lower phase, although the ratio varies considerably.

The upper phase of the two phase system of chlorosulfonic acid, formaldehyde source and methanol tends to swell and dissolve the linear aromatic polymer, but it gives no measurable cross-linking or active side chain formation. The lower phase alone is effective in cross-linking aromatic polymeric chains, but provides very little active side chain formation. However, the combination of the upper and lower phases mixed together with constant vigorous agitation effects cross-linking of an aromatic polymer with a high yield of active side chains. The upper phase swells the polyvinyl aromatic resin, and allows ready penetration into the polymer by the cross-linking and active side chain producing components of the lower phase.

Use of a complex of chlorosulfonic acid, a formaldehyde source, and methanol to treat aromatic polymers results in comparatively rapid disappearance of the upper phase of the complex. The lower phase can be reused by adding the ingredients of the complex, including methanol, to the spent material to replace the moles of the complex that actually enter into the reaction. When this is done, most or all of the added complex enters the lower phase and usually does not form an upper phase. Without the presence of the upper solvent phase to swell the beads, the extent of active side chain formation is limited. It has been surprisingly found that inert substantially non-polar solvents which swell or tend to dissolve the aromatic vinyl polymer and which do not react with the lower phase, can be added as a replacement for the upper phase. Chlorinated aliphatic liquids such as carbon tetrachloride, methylene chloride, ethylene dichloride, tetrachloroethane and perchloroethylene are examples of suitable substitutes for the upper phase when the polymer being treated is an aromatic vinyl resin. Other suitable replacement solvents include petroleum ether, higher molecular weight nitroparaffins, carbon disulfide, and diethyl ether.

The ratio of the added solvent upper phase to the used lower phase of the complex affects the amount of swelling of the aromatic vinyl polymer and also the degree of active side chain formation. As the ratio of upper to lower phase is increased by addition of the solvent, the amount of swelling of the polymer and also the extent of active side chain formation is increased. Small amounts of upper phase solvent provide a correspondingly small amount of swelling and side chain formation. A ratio of about 1 part by volume of added solvent upper phase to from 2 to 50 parts by volume lower phase may generally be employed for obtaining a compromise between side chain formation and swelling of the polymer. Best results are obtained by adding sufficient inert replacement solvent to provide a ratio of about one part by volume of solvent to about seven parts by volume lower phase.

The freshly prepared complex of chlorosulfonic acid, formaldehyde source, and polar liquid tends to dissolve the linear polyvinyl aromatic resin, or at least to cause fusion of linear aromatic particles that contact each other when the polymer is placed in the complex. This difficulty is considerably aggravated if adequate stirring is not maintained since the light polymer tends to rise to the top solvent phase of the complex. Consequently, the mixture is preferably stirred sufficiently to maintain complete interspersion of one phase in the other. It has been found that this problem of partial solution of the polymer can be eliminated by wetting the polymer with sulfuric acid prior to immersion in the complex. The acid slows up the penetration of the upper solvent phase into the polymer and permits the cross-linking component to render the linear polymer insoluble in the upper phase before any of the polymer is dissolved. As an alternate procedure, the upper phase of the complex can be removed, and the linear aromatic polymer can be immersed in the lower phase for a few minutes to partially insolubilize the polymer by cross-linking. The upper phase is then added with stirring to the suspension of polymer in the lower phase in order to swell the polymer to permit introduction of a substantial number of active side chains into the polymer.

The cross-linking constituents and the active side chains that are formed, include an oxygen atom. A strong sulfur-containing acid-formaldehyde complex, without inclusion of a polar solvent produces a weight gain of between about 15 and 30 percent in the linear polyvinyl polymer that is cross-linked without formation of active side chains. These resins that do not have active side chains contain oxygen but do not contain appreciable quantities of halogen even when a halosulfonic acid was employed in the complex. However, when a polar liquid is included in a chlorosulfonic acid-formaldehyde mixture to provide active side chains as well as cross-linking, the weight gains in the linear polymer are between about 70 and 220 percent depending upon the extent of the reaction. Analyses of such polymers indicate the presence of a large amount of chlorine and oxygen in approximately equi-molar amounts, with a typical empirical formula of $C_{16}H_{17}ClO$. When such polymers containing active side chains are heated, hydrochloric acid and formaldehydes are given off and the resultant polymer weighs the same as the cross-linked polymer without active side chains.

Linear aromatic polymers are not suitable for use as resin matrices to which functional ion exchange groups are attached, since they are fusible, and the presence of acidic or basic functional groups renders linear aromatic polymers soluble in polar liquids. Consequently, aromatic monovinyl compounds, such as styrene, are commonly copolymerized with a polyvinyl compound to provide a resin matrix for ion exchange resins that is infusible and insoluble in liquids. Divinylbenzene is the most commonly employed polyvinyl compound for cross-linking monovinyl compounds, particularly in the manufacture of ion exchange resins. However, divinylbenzene is relatively expensive, and the degree of cross-linking obtained with the variable commercial divinylbenzene mixtures is not reproducible. Cross-linking of a linear aromatic polymer by the method of this invention provides an infusible and insoluble ion exchange resin matrix without the necessity of employing divinylbenzene. Beads of aromatic polymer may be formed by suspension polymerization of the monovinyl monomer in the conventional manner, and the resultant beads of the linear aromatic polymer cross-linked by the complex hereof to provide an insoluble and infusible ion exchange resin matrix to which functional exchange groups may be attached.

Furthermore, by the use of the method of this invention, the linear aromatic polymer can be readily shaped by molding the linear polymer under heat and pressure, or dissolving the polymer in a solvent and casting it into the desired matrix form for use in preparing an ion exchange membrane. Perhaps the easiest way of forming a thin matrix film for preparing an ion exchange membrane by the method of this invention is to dissolve the linear aromatic polymer in a solvent, such as methylene chloride, and cast the polymer as a film by pouring the solution on a flat surface, or on a surface of the desired membrane shape. The film of resin matrix is then cross-linked, together with introduction of active side chains, by the complex hereof to render the membrane insoluble and infusible, and functional ion exchange groups are attached by the methods hereinafter described. An alternate method comprises adding the complex to a solution of the linear aromatic polymer, and casting the liquid mixture on a suitable surface on which a solid film of cross-linked polymer is formed.

Heretofore, it has not been practical to make homogeneous ion exchange membranes from resin matrices prepared by cross-linking a monovinyl aromatic compound with a polyvinyl compound because of problems such as the formation of cracks in the membrane during the reaction by which functional ion exchange groups are attached to the matrix. The most practical procedure commonly employed to form ion exchange membranes has been to bind finely divided cross-linked resin particles by means of a thermoplastic linear resin. However, this produces a heterogeneous membrane structure in which the low conductivity of the thermoplastic binder requires increased current consumption during operation of the membrane. Also, the thermoplastic binder tends to melt if overheated. The foregoing difficulties are readily overcome by the method of this invention, whereby a relatively strong homogeneous ion exchange membrane is produced without formation of voids in the membrane by subjecting a film of linear aromatic polymer to the complex of the specified halogen-containing acid, a formaldehyde source, and a polar liquid to produce cross-linking and side chain formation. The resultant ion exchange resin matrix is relatively resistant to structural damage when it is subjected to reactions for introduction of functional ion exchange groups.

Reaction of an aliphatic or aromatic amine with active side chains formed on an aromatic polymer by the complex of halosulfonic acid, formaldehyde source, and polar liquid results in formation of an anion exchange resin, as more completely described in applicants' previously mentioned co-pending application. The anion exchange capacity of such a resin obtained by reaction with a tertiary amine, such as trimethylamine, is substantial, and a strongly basic anion exchange resin is produced. Primary and secondary amines form weakly basic anion exchange resins or acid adsorbents. The hydroxyl form of such anion exchange resins is formed by washing the resins with an alkali. On the other hand, when the aromatic polymer is treated with an acid-formaldehyde complex without including a polar liquid, amination of the resin with an amine does not produce any ion exchange capacity, thereby again illustrating that active side chains are not provided unless a polar liquid is included in the complex.

In addition to formation of anion exchange resins by amination of the active side chains, polymers cross-linked by the complex hereof either with or without active side chains may be employed as ion exchange resin matrices to which functional ion exchange groups are attached. The more hydrophilic structure that contains side chains is preferred for use as an ion exchange resin matrix even if the functional exchange groups are attached directly to the aromatic nuclei without use of the active side chains, since the hydrophilic character of the matrix allows more rapid reaction in attachment of functional exchange groups, and also subsequently more rapid ion exchange reactions. In addition, the resin matrix cross-linked with the halosulfonic acid-formaldehyde complex which contains the polar liquid has a lighter more pleasing appearance than the matrix cross-linked with acid and formaldehyde alone.

Any of the conventional procedures employed for attaching functional ion exchange groups to the common vinyl aromatic resin matrices cross-linked with a polyvinyl compound, such as divinylbenzene, may be utilized with the resin matrices prepared in accordance with this invention. For example, the amination of such resin matrices by nitration and subsequent reduction may be accomplished as described in United States Letters Patent No. 2,366,008 in order to produce an anion exchange resin. Also, strong quaternary ammonium type anion exchange resins may readily be prepared by reacting the cross-linked resin matrix hereof in accordance with the disclosures in United States Letters Patent Nos. 2,591,573 and 2,614,099. Sulfonic acid cation exchange resins are produced by sulfonating the cross-linked aromatic resin matrix hereof with concentrated sulfuric acid, as described in United States Letters Patent No. 2,366,007. Preparation of a sulfonic acid cation exchange resin from a polyvinyl aromatic resin by the method of this invention is particularly advantageous since the polyvinyl aromatic resin may be left in the complex containing either concentrated or fuming sulfuric acid, sulfur trioxide, or chlorosulfonic acid, and the mixture merely heated to provide sulfonation. If desired additional sulfonating agents, such as the aforementioned acids may be added, and the mixture then heated. Another alternative is to wash the cross-linked polymer with water or a polar solvent, dry the polymer, and then sulfonate the polymer in a conventional manner with any suitable sulfonating agent, such as fuming sulfuric acid. Such ion exchange resins can be regenerated after use by conventional procedure.

A zwitterion resin which contains both anionic and cationic groups may readily be prepared from a resin matrix of an aromatic polymer that has been cross-linked together with introduction of active side chains by the method thereof. The matrix is sulfonated with sulfuric acid in the manner previously described to produce cation exchange groups; and then anion exchange groups are attached to the active side chains by subjecting the resin matrix to contact with an amine, as specified herein and as more completely described in applicant's previously mentioned co-pending application.

One of the most advantageous uses of the complex hereof, either with or without the side-chain producing polar liquid, is in converting a pre-shaped linear thermoplastic aromatic polymer that is fusible and soluble in a wide variety of solvents into an infusible and insoluble cross-linked polymer. As previously discussed, the method hereof permits the articles to be shaped under heat and pressure by mass-production techniques, and then cross-linked by immersion in the complex so that the articles will not tend to be deformed by heat or dissolved by organic solvents.

The following are typical examples of the formation of cross-linked aromatic polymers in accordance with this invention:

EXAMPLE 1

*Preparation of a linear aromatic polymer*

A solution containing 1600 ml. of 0.25% by weight polyvinyl alcohol suspending agent in water was placed in a 3 liter round bottom 3-neck flask fitted with a thermometer, stirrer and gas inlet tube. The solution of polyvinyl alcohol was then heated to 90° C. by means of a Glas-Col heating mantle supporting the 3-neck flask. While the polyvinyl alcohol solution was maintained at a temperature of 90° C., nitrogen gas was bubbled into the solution for about 15 minutes, after which 400 ml. of styrene monomer containing 3.6 grams of benzoyl peroxide in solution was added with constant stirring. The temperature of the mixture was maintained at about 90° C. for 16 hours with continuous stirring and addition of nitrogen gas. The contents of the flask were then cooled, and the resultant linear polystyrene beads were washed with water until they were free of polyvinyl alcohol. Excess water was removed from the beads by suction filtration, and the beads were finally dried to constant weight by leaving them in a circulating air oven for twenty-four hours at 65° C.

*Preparation of the complex*

Four moles (417 grams) of 94% sulfuric acid was added to a 3-neck round bottom flask equipped with a stirrer and thermometer, and four moles (132 grams) of 91% paraformaldehyde was added slowly to the sulfuric acid with continuous stirring. During addition of the paraformaldehyde the temperature of the mixture rose to 50° C., and further rise of temperature was prevented by application of a cooling water bath. The mixture of sulfuric acid and paraformaldehyde provided about 320 cc. of a clear, yellow, viscous liquid complex.

*Cross-linking the aromatic polymer*

One-tenth (32 ml.) of the liquid complex of sulfuric acid and paraformaldehyde was mixed with one-tenth mole (10.4 grams) of the linear polystyrene beads prepared as above, and the beads were stirred in the complex contained in a beaker for eight hours at room temperature. The beads were drained and washed successively with water, an aqueous bicarbonate solution, and then with water in order to remove excess acid. Water was removed by drying the beads in an oven for three hours at 95° C. to provide a yield of dry beads weighing 11.5 grams.

The resultant beads were brown, hard and shiny. When the beads of polystyrene that had been cross-linked with the complex were immersed in benzene, toluene, dioxane, carbon tetrachloride, methylene chloride and perchloroethylene, the cross-linked beads were found to be insoluble in the solvents. However, linear polystyrene beads that had not been cross-linked dissolved in such solvents. In addition, the untreated linear polystyrene softened at 80° C. when it was heated, whereas the polystyrene cross-linked with the complex remained hard, and the beads retained their shape without fusion even when they were heated for prolonged periods at 120° C.

EXAMPLE 2

*Preparation of linear aromatic polymer*

A linear polymer of vinyl toluene was prepared in bead form by suspension polymerization. A solution of 1400 ml. containing 0.75% hydroxyethyl cellulose suspending agent in water was heated in a three liter round bottom 3-neck flask. Nitrogen gas was bubbled through the solution for a period of 15 minutes, after which 500 ml. of commercial monomeric vinyl toluene (70% meta and 30% para) containing 2.5 gms. dissolved benzoyl peroxide, was added. The temperature was kept at 90° C. by a Glas-Col heating mantle, and the introduction of nitrogen gas was continued for a period of 40 hours with continuous stirring. The vinyl toluene formed liquid spheres which gelled, and became hard tough beads.

*Preparation of the complex*

A complex was formed by placing 209 ml. of oleum (104.5% $H_2SO_4$) in a 3-neck round bottom flask equipped with a stirrer and thermometer, and then slowly adding four moles (132 grams) of 91% paraformaldehyde to the oleum with constant stirring. The reaction was exothermic, but it was easily controlled by placing the flask in a cooling water bath. The paraformaldehyde dissolved very slowly at temperatures below 35° C., but dissolved rapidly at about 50° C. The resultant mixture of oleum and paraformaldehyde provided about 305 ml. of a brown, hazy, viscous liquid complex.

*Cross-linking the aromatic polymer*

One-tenth mole (11.8 grams) of the linear vinyl toluene polymer beads was stirred in one-tenth (30.5 ml.) of the liquid complex prepared above for 8 hours at room temperature. The resulting beads were washed with water, then with dilute aqueous sodium bicarbonate, and again with water. The beads were dried in an oven at 95° C. for two hours to remove all traces of moisture.

The resultant cross-linked beads were insoluble in solvents for polystyrene, such as benzene and carbon tetrachloride. Also, the beads remained undistorted by heat up to 150° C., whereas the linear uncross-linked polyvinyl toluene softened at 72° C.

EXAMPLE 3

*The linear aromatic polymer*

A section of a frame for a commercial filter prepared by molding linear polystyrene was treated with the complex of this invention to render it insoluble and infusible. This frame has the appearance of an egg crate filler, and had holes one inch square, partitions 1/16 inch thick, and the depth was 15/16 inch.

*Preparation of the complex*

A complex was prepared by adding 4 moles (132 grams) of 91% paraformaldehyde to 4 moles (261 ml.) of chlorosulfonic acid slowly with continuous stirring in the same manner as Examples 1 and 2. The reaction between the paraformaldehyde and chlorosulfonic acid was extremely exothermic, and the mixture was maintained at between 30° C. and 40° C. by immersing the flask in a cold water bath. The resultant mixture provided 320 ml. of a reddish brown, clear, somewhat viscous liquid.

*Cross-linking the aromatic polymer*

A 4 by 6 inch section of the linear polystyrene filter frame was treated by immersion in the complex contained in a shallow glass trough. The contents of the trough was stirred for 6 hours at room temperature by means of two magnetic stirrers. The polystyrene filter frame section was then withdrawn from the complex, washed thoroughly with water, and dried in an oven at 80° C. for 5 hours.

The immersion of the filter frame section in the complex changed the color from white to black, but did not change the dimensions of the section. The surface of the cross-linked polystyrene was smooth and was not dissolved or affected by benzene, carbon tetrachloride or methylene chloride. The cross-linked frame was heat tested by placing it in a temperature controlled oven, and resting a 5 pound lead weight on the frame. Also, a section of the filter frame not treated by the complex was placed in the oven with a five pound weight on top. Comparative results of heating the untreated section and the section subjected to contact with the complex are as follows:

|                    | Distortion Temperature, °C. | Collapse Temperature, °C. |
|--------------------|-----------------------------|---------------------------|
| Untreated Sample   | 75                          | 90                        |
| Cross-linked sample| 130                         | 150                       |

Filter frames of the type cross-linked in this example are employed frequently in the filtration of hot solvents which tend to swell or dissolve polystyrene. Such frames are, therefore, often distorted or dissolved during use, and the treatment with a complex to render the frame insoluble and substantially infusible greatly widens the field of application of such filter frames.

EXAMPLE 4

The aromatic vinyl polymer

A commercial bead form of linear polystyrene sold by Koppers Company, Inc. under the name Koppers KTPL–5 was employed in this example. This linear polystyrene has a monomer content of about 1.2%, a specific gravity of 1.054, and the viscosity of a 30% by weight solution of the polystyrene in toluene at 25° C. is 117 centipoises.

Preparation of the complex

The complex was prepared by adding 1 mole (30 grams) of trioxane slowly to 1 mole (116.5 grams) of chlorosulfonic acid in a 3-neck round bottom flask equipped with thermometer and stirrer. The mixture was continuously stirred without heating during addition of the trioxane, and the maximum temperature provided by the slightly exothermic reaction was 34° C.

Cross-linking the aromatic polymer

One-fourth mole (26 grams) of the polystyrene beads was added to the mixture of chlorosulfonic acid and trioxane in the round bottom flask, and the reaction was allowed to proceed at from 20° C. to 28° C. for 8 hours. During this period, microscopic examination revealed no breakage or spalling of the beads. At the end of the reaction time a portion of the beads was removed, thoroughly washed with cold water, suction filtered to remove excess water, and then dried in an oven at 90° C. for one hour. The resultant cross-linked beads were insoluble in benzene, although they swelled to about 160% of their original volume when immersed in benzene until no further swelling occurred.

Preparation of an ion exchange resin

Immersion of 10 grams of the dried cross-linked beads in 50 ml. of dimethyl ethanolamine for 24 hours at room temperature gave a resin which swelled only slightly in aqueous media, and has a negligible capacity for exchanging anions, namely, 0.05 milli-equivalent per ml. of beads. This illustrates that the polystyrene beads treated with a complex of chlorosulfonic acid and trioxane does not form significant quantities of active side chains capable of reacting with an amine to provide an anion exchange resin.

An additional 2 moles (233 grams) of chlorosulfonic acid was added to the beads that remained in the complex. The temperature was raised gradually to 60° C. by means of a heating mantle, and it was held at about 60° C. with continuous stirring for a period of 2 hours. The contents of the flask was cooled, the excess liquid drained off, and the beads were washed with methylene chloride, then with methanol, and finally with demineralized water until the washings had a pH of 4.5. The strong acid cation exchange capacity was determined by passing an excess of sodium chloride solution through the resin and titrating the acid which was released. The exchange capacity was 1.75 milli-equivalents per ml. The resultant insoluble and infusible cation exchange beads were dark brown.

EXAMPLE 5

The aromatic vinyl polymer

Three moles of linear polystyrene beads prepared in accordance with the procedure specified in Example 1 were employed in this example.

Preparation of the complex

A complex was prepared by placing 12 moles (384 grams) of methanol as the polar solvent, and 12 moles (396 grams) of 91% by weight paraformaldehyde in a 4 liter glass reaction kettle having a separate 4-hole top fitted with a thermometer and stirrer. Twelve moles (1398 grams) of chlorosulfonic acid was added drop-wise to the mixture of methanol and paraformaldehyde accompanied by rapid stirring. The chlorosulfonic acid was added slowly over a period of 4½ hours, and the temperature was maintained below 30° C. by immersing the reaction kettle in a cold water bath. About 15 minutes after all of the chlorosulfonic acid had been added, the complex separated into two phases in which the upper phase was a clear, light colored liquid, and the lower phase was a more viscous yellow liquid. The lower phase comprised about 7 parts by volume of the complex, and the upper phase was about 1 part by volume of the complex.

Cross-linking the aromatic polymers and formation of side chains

Three moles (312 grams) of polystyrene beads were wetted and stirred by hand with 3 ml. of oleum (104.5% $H_2SO_4$), and the polystyrene beads were then added to the complex in the kettle accompanied by rapid stirring. The reaction between the polystyrene beads and the complex was allowed to proceed at 25° C. to 30° C., with occasional cooling by a cold water bath required to maintain the temperature constant. After a period of 8 hours, the excess liquid was drained off and kept as "spent complex" for use in Example 6 and a mixture of crushed ice and water was added to the beads in the kettle so that the maximum temperature reached was 38° C. The beads were then washed thoroughly with water and dried in a warm air cabinet at 40° C. for 16 hours. A yield of 735 grams of cross-linked product was obtained.

Preparation of an anion exchange resin 250 grams of the cross-linked polystyrene was then placed in a liter round bottom flask fitted with a stirrer and thermometer, and 500 ml. of methylene chloride was added to the flask. The resultant polystyrene swelled thoroughly in a period of about one hour. Then 127 ml. of pyridine was added to the swollen beads, with constant stirring, and about one-half hour was allowed for thorough penetration of the pyridine. Next, 240 ml. of dimethyl ethanolamine was incorporated in the mixture. The initial exothermic reaction caused the temperature to rise to 40° C., and the mixture was reduced to room temperature by placing the flask in a cold water bath. The mixture was maintained at room temperature for 20 hours with constant stirring. Then the aminated beads were drained, washed thoroughly with water and converted into the hydroxyl form of washing with an excess of a four percent by weight aqueous solution of sodium hydroxide.

The strong base anion exchange or salt-splitting capacity of the resultant quaternary ammonium anion exchange resin was determined by flowing an excess of a solution of sodium chloride through a 1 inch diameter column of the beads, and titrating the amount of hydroxyl ion liberated. The capacity was found to be 1.0 meq. per ml. The anion exchange beads prepared in this manner were white, opaque, uncracked, perfectly spherical, and substantially insoluble in water, acetone, benzene, toluene, carbon tetrachloride, dioxane, and methylene chloride.

EXAMPLE 6

The aromatic vinyl polymer

Two-tenths of a mole (20.8 grams) of the linear polystyrene beads prepared in accordance with the procedure specified in Example 1 were employed in this example.

Re-use of the complex

In a 500 ml. round bottom flask fitted with a stirrer, thermometer and condenser, 24 grams (0.8 mole) of paraformaldehyde, 25.6 grams (0.8 mole) of methanol, and 53 ml. (0.8 mole) of chlorosulfonic acid was added to 275 ml. of the spent complex from Example 5. A slight exotherm was observed on the addition of the methanol, and the acid had to be added slowly over a period of one-half hour. The flask was cooled with a water bath in order to maintain the temperature below 30° C. There was obtained 375 ml. of a dark brown viscous liquid present in a single phase.

A one-quarter portion of this liquid (93.8 ml.) was mixed with 20.8 grams (0.2 mole) of the polystyrene beads, and the mixture was agitated. After five minutes, 12 ml. of methylene chloride was added, and after three hours with continuous agitation an additional 4 ml. of methylene chloride was added. The total reaction time was 8 hours during which time the temperature was held between 20° C. and 30° C. The excess liquid was drained off and the product thoroughly washed with cold water, and then dried in a warm forced air cabinet at 40° C. for 24 hours. The washed and dried product weighed 59.6 grams, representing a weight gain of 187%.

Preparation of an anion exchange resin

The beads were aminated by the procedure described in Example 5 using one-tenth of the quantities specified therein. The final product was spherical, yellow-white in color, it had a capacity to split salt of 1.1 meq. per ml., and it was insoluble in organic and inorganic liquids.

EXAMPLE 7

The aromatic vinyl polymer

Commercial linear polystyrene beads sold by Koppers Company, Inc. under the name Koppers KTPL-6 were employed in this example. This linear polystyrene has a monomer content of about 1.4%, a specific gravity of 1.052, and the viscosity of a 30% by weight solution of the polystyrene in toluene at 25° C. is 242 centipoises.

Preparation of a film of aromatic polymer

Ten grams of the polystyrene beads were dissolved in 150 grams of ethylene dichloride. The solution was spread on a glass fiber mat so that the mat was thoroughly impregnated. After the solvent had evaporated, the dry impregnated mat was cut up into 2 in. by 2 in. squares. Although the glass mat provides added strength to the film, a film suitable for use in forming an ion exchange membrane can readily be cast without use of a reenforcing mat.

Preparation of a cation exchange membrane

The impregnated squares were reacted with an excess of an equi-molar mixture of chlorosulfonic acid and paraformaldehyde in a glass dish for one hour at room temperature with constant stirring in order to cross-link the linear polymer. An additional 50 ml. of chlorosulfonic acid was then added, and the mixture allowed to react for 6 hours with continuous stirring by means of a magnetic stirrer.

The final product was drained free of excess acid, and washed successively with water, 0.5 N NaOH, then dilute HCl, and finally with water. The homogenous membrane had a cation exchange capacity of 0.06 meq. per square centimeter and 1.10 meq. per cubic centimeter. The membrane was continuous and had no visible surface cracks.

We claim:

1. The method of cross-linking a solid linear mono vinyl aryl polymer selected from the group consisting of a linear polymer of a mono vinyl aryl hydrocarbon and a linear polymer of a mono vinyl aryl nuclear chlorinated hydrocarbon, which comprises reacting said polymer with a mixture of an acid from the group consisting of sulfuric acid and chlorosulfonic acid and formaldehyde at a temperature below about 50° C. to cross-link said polymer, there being at least one mole of acid and one mole of formaldehyde for each aryl group in said polymer, the concentration of acid being at least 70% of the weight of acid and water present.

2. The method of claim 1 in which the acid is chlorosulfonic acid and the formaldehyde is provided by paraformaldehyde.

3. The method of claim 1 in which a primary alcohol containing from 1 to 4 carbon atoms is present in the acid and formaldehyde mixture.

4. The method of claim 3 which includes the step of wetting the linear polymer with sulfuric acid of at least 70% concentration before reaction of the polymer with the mixture including the primary alcohol to prevent partial solution of the linear polymer in the mixture.

5. The method of claim 3 in which said acid, formaldehyde and alcohol are present in amounts to provide at least two moles of each of them for each aryl nucleus in the polymer.

6. The method of claim 1 wherein the linear polymer is in the form of beads of said polymer.

References Cited in the file of this patent

UNITED STATES PATENTS

| | | |
|---|---|---|
| 2,332,896 | D'Alelio | Oct. 26, 1943 |
| 2,332,899 | D'Alelio | Oct. 26, 1943 |
| 2,366,007 | D'Alelio | Dec. 26, 1944 |
| 2,366,008 | D'Alelio | Dec. 26, 1944 |
| 2,591,573 | McBurney | Apr. 1, 1952 |
| 2,629,710 | McBurney | Feb. 24, 1953 |